United States Patent
Beck et al.

(10) Patent No.: US 8,135,792 B2
(45) Date of Patent: Mar. 13, 2012

(54) DYNAMIC ATTRIBUTING OF MESSAGES FOR MESSAGE ESCALATION

(75) Inventors: Hans-Joachim Beck, Rheinstetten (DE); Norbert Becker, Erlangen (DE); Dieter Helmig, Nürnberg (DE); Jürgen Laforsch, Karlsruhe (DE); Michael Schlemper, Erlangen (DE); Stefan Weigel, Röckenhof (DE); Bernhard Zistel, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 1468 days.

(21) Appl. No.: 11/388,019

(22) Filed: Mar. 23, 2006

(65) Prior Publication Data

US 2006/0241799 A1    Oct. 26, 2006

(30) Foreign Application Priority Data

Mar. 30, 2005 (EP) .................................. 05006929

(51) Int. Cl.
*G06F 15/16* (2006.01)
(52) U.S. Cl. ........................................ 709/207; 370/546
(58) Field of Classification Search .................. 700/275, 700/282; 430/506; 717/173, 177, 178; 340/507
See application file for complete search history.

(56) References Cited

U.S. PATENT DOCUMENTS

| 4,816,208 | A |   | 3/1989 | Woods et al. |
| 5,159,546 | A | * | 10/1992 | Inoue et al. ...................... 700/17 |
| 5,655,148 | A | * | 8/1997 | Richman et al. .................. 710/8 |
| 5,768,119 | A |   | 6/1998 | Havekost et al. |
| 5,859,885 | A | * | 1/1999 | Rusnica et al. ............... 376/259 |
| 6,263,255 | B1 | * | 7/2001 | Tan et al. ...................... 700/121 |
| 6,690,274 | B1 | * | 2/2004 | Bristol ......................... 340/506 |
| 6,754,885 | B1 | * | 6/2004 | Dardinski et al. ............ 717/113 |

FOREIGN PATENT DOCUMENTS

DE    100 54 751 A1    5/2002
DE    102 17 107 A1    11/2002

OTHER PUBLICATIONS

IETF RFC 3317, "Differentiated Services Quality of Service Policy Information Base", Chan et al., Mar. 2003.*

* cited by examiner

*Primary Examiner* — Daniel Wu
*Assistant Examiner* — Frederick Ott

(57) ABSTRACT

The invention relates to a system for generating and displaying messages and/or alarms particularly in an automation system of a plant and/or process. The invention further relates to a corresponding method. Using the system and method, messages and/or alarms can easily be displayed differently depending on the state of a production plant or process.

12 Claims, 1 Drawing Sheet

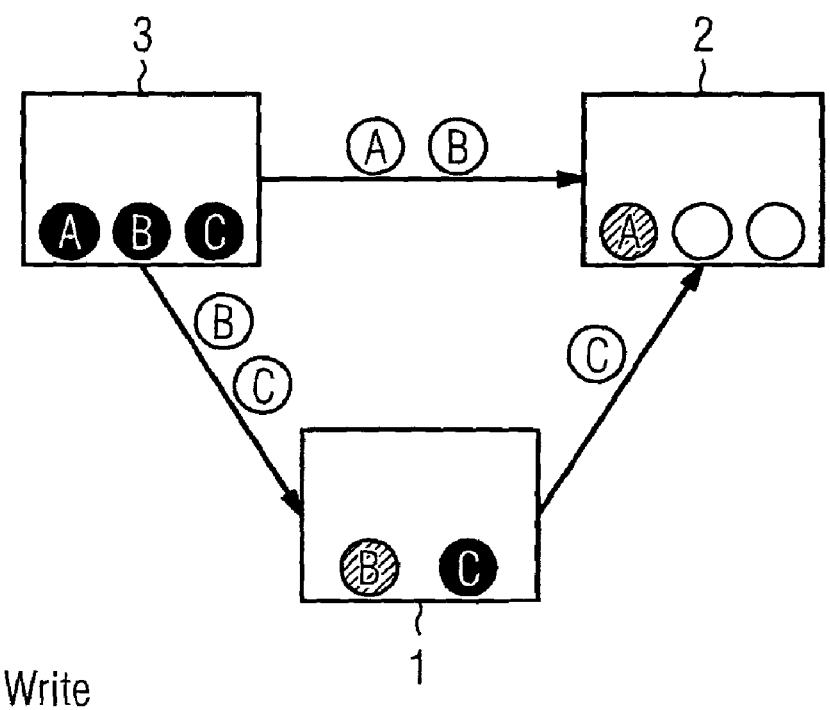

200
DYNAMIC ATTRIBUTING OF MESSAGES FOR MESSAGE ESCALATION

CROSS REFERENCE TO RELATED APPLICATIONS

This application claims priority to the European Application No. EP05006929.3, filed Mar. 30, 2005 which is incorporated by reference herein in its entirety.

FIELD OF INVENTION

The invention relates to a system for generating and displaying messages and/or alarms in particular in an automation system in a plant and/or a process. The invention further relates to a corresponding method.

BACKGROUND OF INVENTION

For the operation and monitoring of automated production equipment in the manufacturing or process industry, for example, events and faults are generally detected from the production process. This information is forwarded to a higher-order component, e.g. an HMI device, in the form of messages or alarms. The messages and alarms can also be combined via a plurality of local units and displayed on a console which is used for overall production monitoring.

SUMMARY OF INVENTION

For a display with high information content it is necessary in some circumstances to additionally weight the messages generated in the production process according to the operating state of the manufacturing plant and/or production process, and then display these messages with their specific priorities. For example, a generated message may have a different relevance depending on the overall state of a plant or process and it is therefore necessary to display it differently on an HMI device depending on this overall state.

Messages and alarms which are to be transmitted from the production process and/or by the plant are already planned in the engineering system as part of configuring an automation solution. The messages, which are to be displayed differently depending on the operating state of the plant and/or process, have until now been e.g. multiply planned in the system. As a result, the messages are present virtually in parallel and one of the parallel messages is then displayed accordingly depending on the state of the plant. However, this approach gives rise to many redundancies within the automation solution.

Another possibility is for the information as to the way in which the message or alarm is to be displayed to be transmitted to the HMI device in the form of a process variable. However, this requires special processing of said information additionally transmitted with the message in the relevant higher-order component, e.g. the HMI device acting as a processing device.

An object of the present invention is therefore to specify a system and a method enabling messages and/or alarms to be displayed differently in a simple manner as a function of the state of a production plant or process.

This object is achieved by a system for generating and displaying messages and/or alarms particularly in an automation system of a plant and/or process, with at least one message trigger for generating at least one message and/or alarm, the message and/or alarm having at least one attribute, and with at least one processing device for displaying the message and/or alarm, the message trigger being designed to transmit the attribute with the message and/or alarm to the at least one processing device, and the processing device having means of evaluating the attribute.

The object is further achieved by a method for generating and displaying messages and/or alarms, particularly in an automation system of a plant and/or process, whereby at least one message and/or alarm is generated by at least one message trigger, the message and/or the alarm having an attribute and the message and/or alarm being displayed by means of at least one processing device, the message trigger transmitting the attribute with the message and/or alarm to the at least one processing device and the attribute being evaluated by the processing device.

As part of creating an automation solution, during the planning phase messages are planned according to the type/instance concept, the messages having different attribute classes. Two attribute classes are used for message planning. The first attribute class contains attributes relating only to the destination systems, e.g. an HMI device. These attributes are made known only to the corresponding destination systems by planning in the engineering system. Such attributes determine e.g. the way in which the message is also displayed to the destination system or HMI device; this can include, for example, displayed font size, color or similar.

A second attribute class which is specified in the engineering system during the planning phase contains attributes which are communicated both to the message generator, e.g. a controller or field device, and to the message receiver, i.e. the destination system, e.g. an HMI device, for interpretation. Such attributes are evaluated by the message triggering systems or message generators, e.g. a controller, and can be interpreted. They contain e.g. information about the processing sequence of messages. However, these attributes are not transmitted to the message receiver, e.g. the HMI device, with a message triggered by the message generator.

The invention is based on the knowledge that, using another attribute class which is generated by the engineering system during message planning, it is possible for the messages to be displayed on the processing device, e.g. the HMI device, as a function of the state of the plant, if the attributes are transmitted with the message from the message trigger, e.g. the controller or an HMI device, directly to the processing device where they can be evaluated.

The attributes can be modified by the message trigger according to the state of the plant, e.g. can be dynamically adapted to suit the relevant plant state, and information as to how the message is to be displayed at the receiver end, e.g. the HMI device, is therefore simultaneously transmitted with the message, thereby avoiding engineering complexity due to repeated planning of messages indicating different plant states for one message result. This saves engineering costs during planning and also system resources within the context of the automation system.

The attribute class which is transmitted by the message generator directly to the message receiver together with the message can be dynamically modified during runtime. This is performed by the message generator as part of the automation solution. The attribute can be evaluated in the destination system, e.g. the HMI device, thereby enabling e.g. escalation strategies for alarm systems to be implemented. The importance of a message can be dynamically modified by the alarm generator as a function of operating parameters and times of events, thereby enabling a message to be displayed in the HMI device e.g. with different priority.

Further advantageous embodiments of the invention are set forth in the dependent claims.

BRIEF DESCRIPTION OF THE DRAWING

The invention will now be described and explained in greater detail with reference to the example illustrated in the accompanying drawing:

DETAILED DESCRIPTION OF INVENTION

FIG. 1 depicts the transmission of attributes between the individual component parts of a system for generating and displaying messages. In a planning device 3, e.g. an engineering system, three attribute classes A, B and C are defined and possibly prioritized. An attribute A is transmitted directly from the planning function in the planning device 3 to the processing device 2, e.g. an HMI system, where it is evaluated. The message generator or message trigger 1, e.g. a controller as the actual initiator of the message, does not know these attributes A. The attributes A are used to describe e.g. the manner in which the message or alarm is displayed. For example, a message is to be displayed flashing on a red background.

The attributes of another attribute class B are, like an attribute A, transmitted to the processing device 2 or the message/destination system and have the same effect in relation to the destination system or processing device 2. In addition, the attributes B are also transmitted to the message initiating device, the message trigger 1, e.g. a control unit or field device, where they can be evaluated. They indicate e.g. the processing sequence of messages. However, the attributes B are not transmitted with a triggered message from the message trigger 1 to processing device 2.

The new attribute class C is likewise created by the planning device 3, the engineering system, during planning. Finally the attributes C of this class are evaluated and displayed in the processing device 2. An attribute C therefore has the same effect as the attributes A and B. In contrast to the attributes of class A and B, the attribute class C is transmitted directly by the message trigger 1, i.e. the controller, for example, to the processing device 2, i.e. the HMI device or console.

By dynamic modification of the attributes C in the message trigger 1, in particular a controller, message processing can be dynamically controlled in the processing device 2 at runtime. For example, the message "cooling water below min value" normally has priority "3" with a normal indication in the processing device 2 or HMI device. However, if the current operating temperature of the machine has simultaneously fallen below a defined limit value, the message is dynamically set e.g. to priority 2 by the message generator or message trigger 1, i.e. a controller. As a result, additional signaling such as an alarm horn is triggered in the processing device 2, i.e. on the HMI device.

The invention claimed is

1. A system for generating and displaying messages or alarms in a production process using automated production equipment in a factory automation system, comprising:
at least one message trigger for generating at least one message or alarm in response to an event, fault or other condition monitored in the production process, the message or the alarm having at least one variable at-tribute determinative as to how, or in what sequence, the message or alarm is to be displayed; and
at least one processing device for displaying the message or the alarm in accord with a current indication, based on attribute information, as to how or in what sequence the message or alarm is to be displayed, wherein
the message trigger is configured to transmit the attribute together with the message or the alarm to the processing device, and
the processing device has an evaluation unit for evaluating the attribute and providing display in accord therewith, wherein the message trigger is configured to dynamically modify the attribute, and
a planning device for defining at least first, second and third attribute classes and for transmitting the at least one attribute to the processing device, wherein such attribute falling into the second attribute class is transmitted to the message trigger, and such attribute falling into the third attribute class is transmitted to the processing device via the message trigger.

2. The system according to claim 1, wherein displaying the message or the alarm is based on the evaluation of the attribute.

3. The system according to claim 1, wherein the processing device is configured to dynamically process or dynamically display, respectively, the message or the alarm based on the evaluation of the attribute.

4. The system according to claim 1, wherein the message trigger is a controller.

5. The system according to claim 1, wherein the processing device is an HMI system.

6. A method for generating and displaying messages or alarms in a production process using automated production equipment in a factory automation system, comprising:
generating at least one message or alarm by at least one message trigger in response to an event, fault or other condition monitored in the production process;
providing for the message or the alarm at least one variable attribute determinative as to how, or in what sequence, the message or alarm is to be displayed;
transmitting the attribute together with the message or the alarm to a processing device with the message trigger;
evaluating the attribute with the processing device;
displaying the message or the alarm with the processing device in accord with a current indication, based on attribute information, as to how or in what sequence the message or alarm is to be displayed;
wherein the message trigger is configured to dynamically modify the attribute, and
a planning device for defining at least first, second and third attribute classes and for transmitting the at least one attribute to the processing device, wherein such attribute falling into the second attribute class is transmitted to the message trigger, and such attribute falling into the third attribute class is transmitted to the processing device via the message trigger.

7. The method according to claim 6, wherein the message or the alarm is displayed based on the evaluation of the attribute.

8. The method according to claim 6, wherein the attribute is dynamically modified by the message trigger such that the respective message or the respective alarm is displayed differently reflecting a change of state of a process represented by the message or the alarm.

9. The method according to claim 6, wherein the message or the alarm is processed dynamically or displayed dynamically based on the evaluation of the attribute.

10. The method according to claim 6, further comprising:
defining attributes falling into at least one of a first, second and third attribute class by a planning device; and transmitting the defined attributes to the processing device by the planning device.

11. The method according to claim 10, wherein
such attributes falling into the first and second attribute classes are transmitted by the planning device to the at least one processing device,
such attributes falling into the second and third attribute classes are transmitted by the planning device to the message trigger, and
such attributes falling into the third attribute class are transmitted by the message trigger to the at least one processing device.

12. The method according to claim 10, wherein
such attributes falling into the first and second attribute classes are transmitted by the planning device to the at least one processing device,
such attributes falling into the second and third attribute classes are transmitted by the planning device to the message trigger, and
such attributes falling into the third attribute class are only transmitted to the at least one processing device by the message trigger.

\* \* \* \* \*